United States Patent
Yang et al.

(10) Patent No.: US 11,356,907 B2
(45) Date of Patent: Jun. 7, 2022

(54) TRANSMISSION METHOD AND PROCESSING METHOD OF NEIGHBOR CELL INFORMATION, NETWORK SIDE DEVICE, AND TERMINAL

(71) Applicant: VIVO MOBILE COMMUNICATION CO., LTD., Chang'an Dongguan (CN)

(72) Inventors: Xiaodong Yang, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/620,765

(22) PCT Filed: Jun. 7, 2018

(86) PCT No.: PCT/CN2018/090288
§ 371 (c)(1),
(2) Date: Dec. 9, 2019

(87) PCT Pub. No.: WO2018/224012
PCT Pub. Date: Dec. 13, 2018

(65) Prior Publication Data
US 2021/0144596 A1 May 13, 2021

(30) Foreign Application Priority Data
Jun. 9, 2017 (CN) .......................... 201710433322.9

(51) Int. Cl.
*H04W 36/00* (2009.01)
*H04W 24/10* (2009.01)
(Continued)

(52) U.S. Cl.
CPC ....... *H04W 36/0061* (2013.01); *H04W 24/10* (2013.01); *H04W 36/0072* (2013.01); *H04W 52/0248* (2013.01); *H04W 56/001* (2013.01)

(58) Field of Classification Search
CPC ............. H04W 36/0061; H04W 24/10; H04W 56/001; H04W 36/0072; H04W 52/0248
See application file for complete search history.

(56) References Cited

U.S. PATENT DOCUMENTS

| | | | |
|---|---|---|---|
| 9,237,459 B1 * | 1/2016 | Erell | H04B 17/309 |
| 2008/0233988 A1 | 9/2008 | Yang et al. | |
| 2012/0044928 A1 | 2/2012 | Bhattad et al. | |
| 2014/0314072 A1 | 10/2014 | Awad et al. | |
| 2015/0117375 A1 | 4/2015 | Sartori et al. | |
| 2016/0057719 A1 | 2/2016 | Centonza | |

(Continued)

FOREIGN PATENT DOCUMENTS

| | | |
|---|---|---|
| CN | 101043261 A | 9/2007 |
| CN | 101557604 A | 10/2009 |

(Continued)

OTHER PUBLICATIONS

Third Chinese Office Action Application No. 201710433322.9; dated Jun. 11, 2020.

(Continued)

*Primary Examiner* — Deepa Belur
(74) *Attorney, Agent, or Firm* — von Briesen & Roper, s.c.

(57) ABSTRACT

A method of transmitting neighbor cell information, a method of processing neighbor cell information, a network side device, and a terminal are provided. The method of processing the neighbor cell information includes: receiving, by a terminal, synchronization-related information of a (Continued)

neighbor cell transmitted by a network side device; and parsing, by the terminal, the synchronization-related information.

20 Claims, 5 Drawing Sheets

(51) Int. Cl.
*H04W 52/02* (2009.01)
*H04W 56/00* (2009.01)

(56) References Cited

U.S. PATENT DOCUMENTS

| | | | |
|---|---|---|---|
| 2016/0174176 A1* | 6/2016 | Adachi | H04B 17/318 370/350 |
| 2018/0270775 A1 | 9/2018 | Zhang et al. | |
| 2019/0150108 A1* | 5/2019 | Byun | H04W 56/001 370/329 |
| 2019/0335406 A1* | 10/2019 | Akkarakaran | H04W 56/0015 |
| 2020/0059810 A1* | 2/2020 | Harada | H04W 24/10 |
| 2022/0014978 A1* | 1/2022 | Chong | H04W 36/0058 |

FOREIGN PATENT DOCUMENTS

| | | | | |
|---|---|---|---|---|
| CN | 102026216 A | 4/2011 | | |
| CN | 102421114 A | 4/2012 | | |
| CN | 103916903 A | 7/2014 | | |
| CN | 103997774 A | 8/2014 | | |
| CN | 104703164 A | 6/2015 | | |
| CN | 105915309 A | 8/2016 | | |
| CN | 105992334 A | 10/2016 | | |
| CN | 106332168 A | 1/2017 | | |
| CN | 108789800 A | 5/2017 | | |
| EP | 2583502 A | 11/2016 | | |
| GN | 103931133 A | 7/2014 | | |
| WO | WO-2010017738 A1 * | 2/2010 | | H04W 76/40 |
| WO | WO 2013141541 A1 | 3/2013 | | |
| WO | WO 2014176781 A1 | 5/2013 | | |
| WO | WO 2017084607 A1 | 5/2017 | | |
| WO | WO-2018224012 A1 * | 12/2018 | | H04W 36/00 |

OTHER PUBLICATIONS

Guangdong Oppo Mobile Telecom; "Discussion on the mobility measurement for the connected mode UE", 3GPP TSG RAN WG1 meeting #88bis, R1-1704606, Spokane, Washington, USA, Apr. 3, 2017-Apr. 7, 2017.
LG Electronics "Discussion on SS block time index indication", 3GPP TSG RAN WG1 Meeting #89, R1-1707589, Hangzhou, P.R. China, May 15, 2017-May 19, 2017.
Chinese Office Action Application No. 201710433322.9; dated Nov. 27, 2019.
Chinese Office Action Application No. 201710433322.9; dated Mar. 25, 2020.
European Search Report Application No. 18812749.2; dated Apr. 20, 2020.
International Search Report & Written Opinion related to Application No. PCT/CN2018/090288; dated Dec. 19, 2019.
ZTE, ZTE Microelectronics, "Considerations on SS burst design", 3GPP TSG RAN WG1 Meeting#87, R1-1641269.
Huawei, Hisilicon, "CSI-RS Design for L3 Mobility", 3GPP TSG RAN WG1 Meeting #89, RI-1708165.
Nokia, Alcatel-Lucent Shanghai Bell, "SS block time index indication", 3GPP TSG-RAN WG1 Meeting #89, R1-1708233.
NTT DOCOMO, Inc., "Discussion and evaluallon on NR RRM measurement based on SS block", 3GPP TSG-RAN WG1 Meeting #89, R1-1708444.
VIVO, "SS block and CSI-RS based measurement configuration in RRC_Connected state", 3GPP TSG-RAN WG2 Meeting #99, R2-1708420.
VIVO, "Sync assistant information for RRC idle/inactive state", 3GPP TSG-RAN WG2 Meeting #99, R2-4708433.
VIVO, "Remaining issues for measurement object", 3GPP TSG-RAN WG2 Meeting #100, R2-1712766.
ZTE, "Discussion on cell identification in NR", 3GPP TSG-RAN WG4 Meeting #83, R4-1705178.
Communication pursuant to Article 94(3) EPC related to Application No. 18 812 749.2; reported on Dec. 17, 2021.
Nokia et al., "On Requirements and Design of SS Burst Set and SS Block Index Indication", 3GPP TSG-RAN WG1 Meeting #88, Athens, Greece Feb. 13-17, 2017, R1-1703092.

* cited by examiner

US 11,356,907 B2

TRANSMISSION METHOD AND PROCESSING METHOD OF NEIGHBOR CELL INFORMATION, NETWORK SIDE DEVICE, AND TERMINAL

CROSS-REFERENCE TO RELATED APPLICATION

This patent application is a 35 USC § 371 U.S. national stage of International Application No. PCT/CN2018/090288 filed on Jun. 7, 2018, which claims a priority to Chinese Patent Application No. 201710433322.9 filed in China on Jun. 9, 2017, the disclosure of which is incorporated in its entirely by reference herein.

TECHNICAL FIELD

The present disclosure relates to the field of communication technology, and more particularly, relates to a method of transmitting neighbor cell information, a processing method of neighbor cell information, a network side device, and a terminal.

BACKGROUND

In a Long Term Evolution (LTE) system, a terminal (or a User Equipment (UE)) in an idle state needs to measure a neighbor cell, in order to find a proper resident cell in a case that the terminal moves or a signal quality of a current serving cell is low.

In a Fifth Generation (5G) mobile communication system, a terminal in an idle state also needs to measure a neighbor cell. In the 5G system, in a case that the terminal measures the neighbor cell, if information of the neighbor cell is not clearly known at all, the neighbor cell needs to be re-searched. Since there are a plurality of neighbor cells, the search for the plurality of neighbor cells may consume a large amount of time and power of the terminal.

How to simplify a process of measuring a neighbor cell by a terminal is a technical problem to be solved urgently.

SUMMARY

In view of the above, the present disclosure provides a method of transmitting neighbor cell information, a method of processing neighbor cell information, and a device.

A first aspect of the present disclosure provides method of transmitting neighbor cell information. The method includes determining, by a network side device, synchronization-related information of a neighbor cell; and transmitting, by the network side device, the synchronization-related information of the neighbor cell to a terminal.

A second aspect of the present disclosure provides a method of processing neighbor cell information. The method includes receiving, by a terminal, synchronization-related information of a neighbor cell transmitted by a network side device; and parsing, by the terminal, the synchronization-related information.

A third aspect of the present disclosure provides a network side device. The network side device includes a determination module, configured to determine synchronization-related information of a neighbor cell; and a transmission module, configured to transmit the synchronization-related information of the neighbor cell to a terminal.

A fourth aspect of the present disclosure provides a terminal. The terminal includes a reception module, configured to receive synchronization-related information of a neighbor cell transmitted by a network side device; and a parsing module, configured to parse the synchronization-related information.

A fifth aspect of the present disclosure provides a network side device. The network side device includes a storage, a processor, and a computer program stored on the storage and executable by the processor, wherein the processor implements the method of transmitting the neighbor cell information according to the first aspect when the processor executes the program.

A sixth aspect of the present disclosure provides a terminal. The terminal includes a storage, a processor, and a computer program stored on the storage and executable by the processor; wherein the processor implements the method of processing the neighbor cell information according to the second aspect when the processor executes the program.

A seventh aspect of the present disclosure provides a non-volatile computer readable storage medium. The non-volatile computer readable storage medium includes a computer program stored on the computer readable storage medium, wherein when the program is executed by a processor, the processor implements steps in the method of transmitting neighbor cell information according to the first aspect.

An eighth aspect of the present disclosure provides a non-volatile computer readable storage medium. The non-volatile computer readable storage medium includes a computer program stored on the computer readable storage medium, wherein when the program is executed by a processor, the processor implements steps in the method of processing neighbor cell information according to the second aspect.

DETAILED DESCRIPTION

In order to solve a problem that in a Fifth Generation (5G) mobile communication system, a terminal in an idle state needs to re-search a plurality of neighbor cell in a case of measuring the neighbor cells, and consumes a large amount of time and power of the terminal, some embodiments of the present disclosure provide a method of transmitting neighbor cell information, a processing method of neighbor cell information, a network side device, and a terminal. In some embodiments of the present disclosure, the terminal receives and parses synchronization-related information of a neighbor cell transmitted by a network side device, so that the terminal may measure the neighbor cell according to the synchronization-related information, the number of synchronization signal measurements to the neighbor cell may be reduced, a process of measuring the neighbor cell by the terminal may be simplified, and the time and power consumed in a case that the terminal measures neighbor cell may be reduced.

In order to make an objective, a technical solution and an advantage of some embodiments of the present disclosure clearer, technical solutions of some embodiments of the present disclosure will be clearly and completely described below in connection with accompanying drawings of some embodiments of the present disclosure. It will be apparent that the described embodiments are a part, rather than all, of the embodiments of the present disclosure. All other embodiments obtained by those of ordinary skills in the art based on the described embodiments of the present disclosure fall within the scope of the present disclosure.

Figure 1:
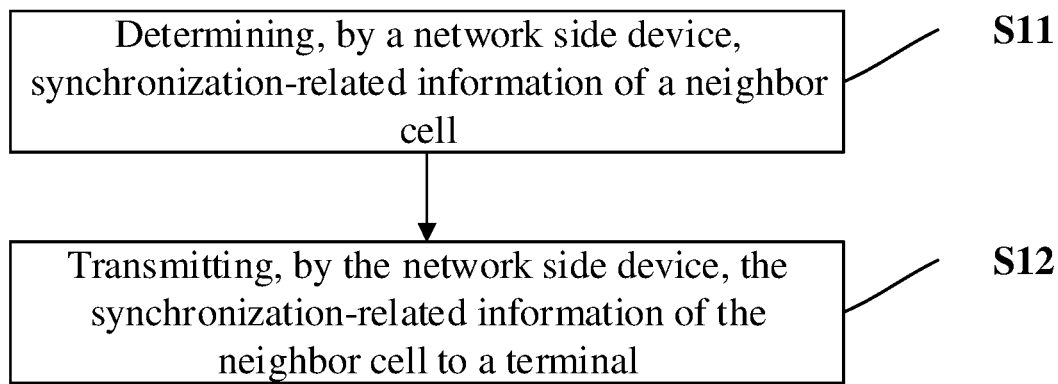
FIG. 1 is a flowchart of a method of transmitting neighbor cell information provided by the present disclosure.

FIG. 1 is a flow chart of a method of transmitting neighbor cell information provided by the present disclosure. An execution entity of the method of transmitting the neighbor cell information is a network side device. The method of transmitting the neighbor cell information includes steps S1-S12.

Step S11: determining, by the network side device, synchronization-related information of the neighbor cell.

The synchronization-related information refers to information related to a synchronization signal of the neighbor cell.

Step S12: transmitting, by the network side device, the synchronization-related information of the neighbor cell to the terminal.

By the method of transmitting the neighbor cell information provided by some embodiments of the present disclosure, the network side device may transmit the synchronization-related information of the neighbor cell to the terminal, so that the terminal may measure the synchronization signal of the neighbor cell according to the synchronization-related information. Thus, the number of the synchronization signal measurements to the neighbor cell may be reduced, the process of measuring the neighbor cell by the terminal may be simplified, and the time and the power consumed in a case that the terminal measures the neighbor cell may be reduced.

In some embodiments of the present disclosure, the network side device may be a Base Transceiver Station (BTS, for short) in a Global System of Mobile communication (GSM, for short) or a Code Division Multiple Access (CDMA, for short), or a Node B (NB, for short) in a Wideband Code Division Multiple Access (WCDMA, for short), or an Evolutional Node B (eNB or eNodeB, for short) in Long Term Evolution (LTE), or a relay station or an access point, or a base station in a future 5G network or the like. The present disclosure is not limited thereto.

The terminal may be a wireless terminal or a wired terminal. The wireless terminal may be a device that provides voice and/or other service data connectivity to a user, a handheld device having a wireless connection function, or another processing device connected to a wireless modem. The wireless terminal may communicate with one or more core networks via a Radio Access Network (RAN), and the wireless terminal may be a mobile terminal, such as a mobile telephone (or a cellular phone) and a computer including a mobile terminal, for example, a portable mobile device, a pocket-sized device, a handheld device, a computer-inbuilt device or an on-board mobile device, which exchanges language and/or data with a wireless access network. For example, a Personal Communication Service (PCS) phone, a cordless phone, a Session Initiation Protocol (SIP) phone, a Wireless Local Loop (WLL, for short) station, a Personal Digital Assistant (PDA). The wireless terminal may also be referred to as a system, a Subscriber Unit, a Subscriber Station, a Mobile Station, a Mobile, a Remote Station, a Remote Terminal, an Access Terminal, a User Terminal, a User Agent and a User Device or a User Equipment. The present disclosure is not limited thereto.

In some embodiments of the present disclosure, the synchronization-related information of the neighbor cell includes one or more of the following: information indicating that a synchronization signal of a neighbor cell is in sync with a synchronization signal of a serving cell of the terminal; information indicating that the synchronization signal of the neighbor cell is out of sync with the synchronization signal of the serving cell; information indicating that synchronization signals of at least a part of neighbor cells are in sync with the synchronization signal of the serving cell; information indicating that the synchronization signals of at least a part of the neighbor cells are out of sync with the synchronization signal of the serving cell; information indicating that not all of the synchronization signals of at least a part of the neighbor cells are in sync with the synchronization signal of the serving cell; offset information of the synchronization signal of the neighbor cell relative to the synchronization signal of the serving cell; information indicating that a period of the synchronization signal of the neighbor cell is the same as that of the synchronization signal of the serving cell; information indicating that the period of the synchronization signal of the neighbor cell is different from that of the synchronization signal of the serving cell; information indicating that periods of synchronization signals of at least a part of neighbor cells are the same as that of the synchronization signal of the serving cell; information indicating that the periods of the synchronization signals of at least a part of the neighbor cells are different from that of the synchronization signal of the serving cell; information indicating that not all of the periods of the synchronization signals of at least a part of the neighbor cells are the same as that of the synchronization signal of the serving cell; information indicating that a pattern of the synchronization signal of the neighbor cell is the same as that of the synchronization signal of the serving cell; information indicating that the pattern of the synchronization signal of the neighbor cell is different from that of the synchronization signal of the serving cell; information indicating that patterns of synchronization signals of at least a part of neighbor cells are the same as that of the synchronization signal of the serving cell; information indicating that the patterns of the synchronization signals of at least a part of the neighbor cells are different from that of the synchronization signal of the serving cell; information indicating that not all of the patterns of the synchronization signals of at least a part of the neighbor cells are the same as that of the synchronization signal of the serving cell; information about the number of synchronization signal blocks in the synchronization signal of the neighbor cell; minimum index information of the synchronization signal blocks in the synchronization signal of the neighbor cell; and maximum index information of the synchronization signal blocks in the synchronization signal of the neighbor cell.

The method of transmitting the neighbor cell information provided in some embodiments of the present disclosure may be applied to an LTE system, a 5G system, and forthcoming other communication systems.

In a case that the method of transmitting neighbor cell information in some embodiments of the present disclosure is applied to a 5G system, the above synchronization signal may be a Synchronization-Signal-block (SS block) set. The Synchronization Signal Block is an SS block (Synchronization Signal block).

In a 5G system, a SS block is introduced for downlink synchronization of the terminal, and the terminal measures the SS block of the neighbor cell in a case that the terminal measures the neighbor cell. The SS block includes a Primary Synchronization Signal (PSS), a Secondary Synchronization Signal (SSS), Physical Broadcast Channel (PBCH) information. The terminal may acquire a Physical Cell Identifier of the cell according to the PSS and the PSS in the SS block, and thus, the terminal may measure a signal quality of the neighbor cell based on the Physical Cell Identifier.

In the 5G system, since a cell has multiple beam directions, a network side device corresponding to the cell transmits the SS block set. The SS block set includes a plurality of SS blocks, wherein each of the plurality of SS blocks corresponds to a beam direction of the cell. In a case that the number of beams in a cell changes, the SS blocks in the SS block set of the cell are also changed.

Figure 2:
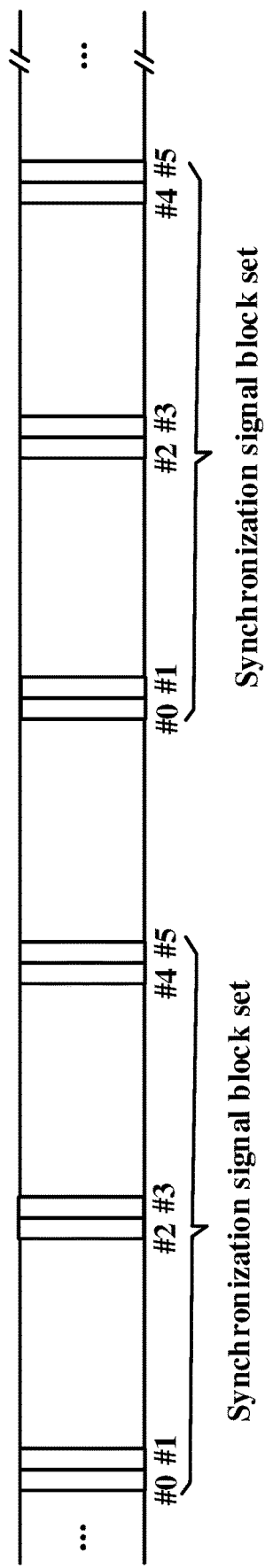
FIG. 2 is a schematic structural diagram of a synchronization-signal-block set of a serving cell in the present disclosure.

Referring to FIG. 2, FIG. 2 is a schematic structural diagram of a SS block set of a serving cell in the present disclosure. As may be seen from FIG. 2, each SS block set of the Serving Cell includes 6 SS blocks, and each SS block corresponds to a direction of one beam. Each SS block set is required to be completely transmitted within 5 ms.

Processing procedures of the network side device and the terminal in a case that synchronization-related information of neighbor cells are different will be described by way of example hereinafter.

In some embodiments of the present disclosure, the network side device may compare whether a synchronization signal of a neighbor cell is in sync with a synchronization signal of a serving cell of the terminal.

In a case that the network side device determines that the synchronization signal of the neighbor cell is in sync with the synchronization signal of the serving cell through the comparison, the network side device may transmit to the terminal the information indicating that the synchronization signal of the neighbor cell is in sync with the synchronization signal of the serving cell.

After the terminal receives the information, the terminal may directly detect the synchronization signal of the neighbor cell at a position of the synchronization signal of the serving cell, thereby the number of the synchronization signal measurements to the neighbor cell by the terminal may be reduced, the process of measuring the neighbor cell by the terminal may be simplified, and the time and the power consumed by the terminal in case of measuring the neighbor cell may be reduced.

In some embodiments of the present disclosure, in a case that the network side device determines that the synchronization signal of the neighbor cell is out of sync with the synchronization signal of the serving cell through the comparison, the network side device may transmit to the terminal the information indicating that the synchronization signal of the neighbor cell is out of sync with the synchronization signal of the serving cell. In this way, the number of the synchronization signal measurements to the neighbor cell by the terminal may also be reduced to some extent.

In some embodiments of the present disclosure, in a case that the network side device determines that the synchronization signal of the neighbor cell is out of sync with the synchronization signal of the serving cell through the comparison, the network side device may further determine the offset information of the synchronization signal of the neighbor cell relative to the synchronization signal of the serving cell, and transmit the offset information of the synchronization signal of the neighbor cell relative to the synchronization signal of the serving cell to the terminal. The terminal may determine a position of the synchronization signal of the neighbor cell based on the offset information, thereby the number of the synchronization signal measurements to the neighbor cell by the terminal may be reduced, the process of measuring the neighbor cell by the terminal may be simplified, and the time and the power consumed by the terminal in case of measuring the neighbor cell may be reduced.

The offset information may be, for example, that the synchronization signal of the neighbor cell is one slot ahead of the synchronization signal of the serving cell.

Figure 3:
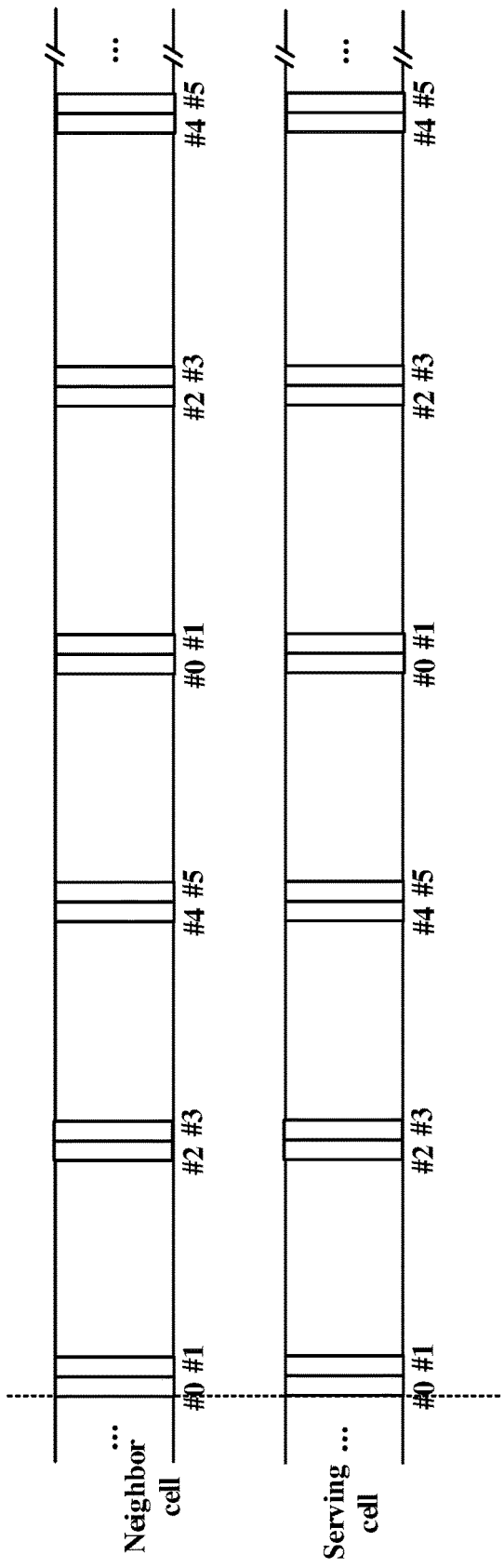
FIG. 3 is a schematic diagram in a case that a synchronization-signal-block set of a serving cell and a synchronization-signal-block set of a neighbor cell of the present disclosure are in sync.

Taking FIG. 3 as an example, FIG. 3 is a schematic diagram in a case that the SS block set of the serving cell is in sync with the SS block set of the neighbor cell in the present disclosure. As may be seen from FIG. 3, a position of each of SS blocks in the SS block set of the neighbor cell is aligned with a position of a SS block in the SS block set of the serving cell, that is, the SS block set of the serving cell is in sync with the SS block set of the neighbor cell. The network side device transmits to the terminal the information indicating that the SS block set of the serving cell is in sync with the SS block set of the neighbor cell. After the terminal receives the indication information, the terminal may directly detect the SS block of the neighbor cell at a position of the SS block of the serving cell, thereby the number of measurements to the SS block set of the neighbor cell by the terminal may be reduced, the process of measuring the neighbor cell by the terminal may be simplified, and the time and the power consumed by the terminal in case of measuring the neighbor cell may be reduced.

Figure 4:
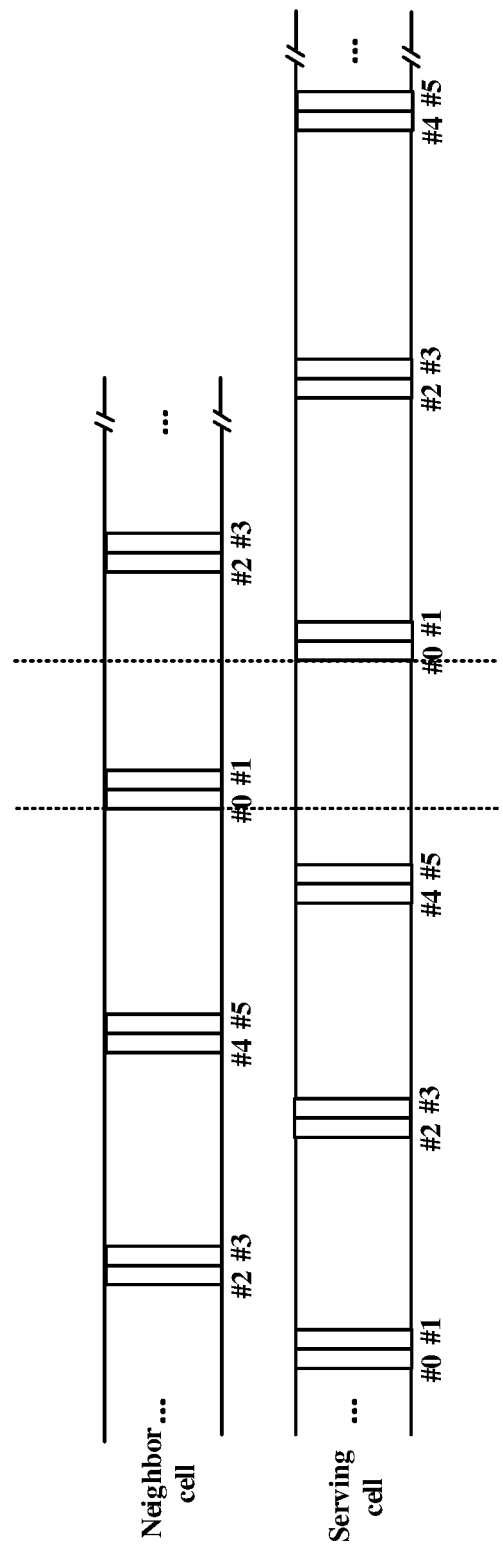
FIG. 4 is a schematic diagram in a case that a synchronization-signal-block set of a serving cell and a synchronization-signal-block set of a neighbor cell of the present disclosure are out of sync.

Taking FIG. 4 as an example, FIG. 4 is a schematic diagram in a case that the SS block set of the serving cell is out of sync with the SS block set of the neighbor cell in the present disclosure. As may be seen from FIG. 4, a position of a SS block in the SS block set of the neighbor cell is not aligned with a position of a SS block in the SS block set of the serving cell, that is, the SS block set of the serving cell is out of sync with the SS block set of the neighbor cell. The network side device may further determine offset information of the SS block set of the neighbor cell relative to the SS block set of the serving cell (e.g., the offset information is one slot ahead), and transmit the offset information of the SS block set of the neighbor cell relative to the SS block set of the serving cell to the terminal. The terminal may, based on the offset information, determine a position of the SS block set of the neighbor cell. Thereby, the number of measurements to the SS block set of the neighbor cell by the terminal may be reduced, the process of measuring the neighbor cell by the terminal may be simplified, and the time and the power consumed by the terminal in case of measuring the neighbor cell may be reduced.

In some embodiments of the present disclosure, the network side device may compare whether a period of the synchronization signal of the neighbor cell is the same as a period of the synchronization signal of the serving cell of the terminal or not.

In the 5G system, periods of SS block sets corresponding to different cells may be different, for example, may be 20 ms, 10 ms, 5 ms, etc.

In a case that the network side device determines that the period of the synchronization signal of the neighbor cell is the same as the period of the synchronization signal of the serving cell through the comparison, the network side device transmits the information indicating that the period of the synchronization signal of the neighbor cell is the same as the period of the synchronization signal of the serving cell to the terminal. The terminal may detect the synchronization signal of the neighbor cell in the same period as the period of the synchronization signal of the serving cell. Thereby, the number of the synchronization signal measurements to the neighbor cell by the terminal may be reduced, the process of measuring the neighbor cell by the terminal may be simplified, and the time and the power consumed by the terminal in case of measuring the neighbor cell may be reduced.

In a case that the network side device determines that the period of the synchronization signal of the neighbor cell is the same as the period of the synchronization signal of the serving cell through comparison, the network side device may also transmit the information indicating that the period of the synchronization signal of the neighbor cell is different from the period of the synchronization signal of the serving cell to the terminal. The number of the synchronization signal measurements to the neighbor cell by the terminal may also be reduced to some extent.

In some embodiments of the present disclosure, the network side device may compare whether a pattern of a synchronization signal of a neighbor cell is the same as a pattern of a synchronization signal of a serving cell of the terminal or not.

A same pattern of two synchronization signals means the number of synchronization signal blocks in one of the two synchronization signals is the same as the number of synchronization signal blocks in the other of the two synchronization signals. Taking the 5G system as an example, a same pattern of two SS block sets means that the number of SS blocks in one of the two SS block sets is the same as the number of SS blocks in the other of the two SS block sets.

In a case that the network side device determines that the pattern of the synchronization signal of the neighbor cell is the same as the pattern of the synchronization signal of the serving cell through comparison, the network side device may transmit to the terminal the information indicating that the pattern of the synchronization signal of the neighbor cell is the same as the pattern of the synchronization signal of the serving cell. The terminal may directly acquire the pattern of the synchronization signal of the neighbor cell. Thereby, the number of the synchronization signal measurements to the neighbor cell by the terminal may be reduced, the process of measuring the neighbor cell by the terminal may be simplified, and the time and the power consumed by the terminal in case of measuring the neighbor cell may be reduced.

In some embodiments of the present disclosure, in a case that the network side device determines that the pattern of the synchronization signal of the neighbor cell is different from the pattern of the synchronization signal of the serving cell, the network side device may also transmit to the terminal the information indicating that the pattern of the synchronization signal of the neighbor cell is different from the pattern of the synchronization signal of the serving cell, and the number of the synchronization signal measurements to the neighbor cell by the terminal may be reduced to some extent.

In some embodiments of the present disclosure, in a case that the network side device determines that the pattern of the synchronization signal of the neighbor cell is different from the pattern of the synchronization signal of the serving cell through comparison, the network side device may further transmit information about the number of synchronization signal blocks in the synchronization signal of the neighbor cell to the terminal, so that the terminal may directly acquire the number of synchronization signal blocks in the synchronization signal of the neighbor cell. The number of the synchronization signal measurements to the neighbor cell by the terminal may be reduced, the process of measuring the neighbor cell by the terminal may be simplified, and the time and the power consumed by the terminal in case of measuring the neighbor cell may be reduced.

The information about the number of synchronization signal blocks may be the specific number of synchronization signal blocks in the synchronization signal of the neighbor cell, or comparison information between the number of synchronization signal blocks in the synchronization signal of the neighbor cell and the number of synchronization signal blocks in the synchronization signal of the serving cell. For example, the number of synchronization signal blocks in the synchronization signal of the neighbor cell is smaller than or larger than the number of synchronization signal blocks in the synchronization signal of the serving cell.

In some embodiments of the present disclosure, in a case that the network side device determines that the pattern of the synchronization signal of the neighbor cell is different from the pattern of the synchronization signal of the serving cell through the comparison, the network side device may further transmit to the terminal the minimum index information of the synchronization signal blocks in the synchronization signal of the neighbor cell, and/or the maximum index information of the synchronization signal blocks in the synchronization signal of the neighbor cell, so that the terminal may indirectly acquire the number of synchronization signal blocks in the synchronization signal of the neighbor cell. Thereby, the number of the synchronization signal measurements to the neighbor cell by the terminal may be reduced, the process of measuring the neighbor cell by the terminal may be simplified, and the time and the power consumed by the terminal in case of measuring the neighbor cell may be reduced.

Taking the 5G system as an example, since the number of SS blocks in the SS block set of each cell is undetermined, timing index information is carried in a SS block, in order to help the terminal acquire a correct SS block. The timing index information indicates a position of the SS block in a corresponding SS block set. The timing index information may be transmitted in the PBCH in the SS block or may be transmitted at another location in the SS block.

In some embodiments of the present disclosure, the network side device may compare whether the pattern of the SS block set of the neighbor cell is the same as that of the SS block set of the serving cell or not. In a case that the network side device determines that the pattern of the SS block set of the neighbor cell is different from the pattern of the SS block set of the serving cell through the comparison, the network side device transmits to the terminal the minimum index information of the SS block in the SS block set of the neighbor cell and/or the maximum index information of the SS block in the SS block set of the neighbor cell, so that the terminal may indirectly acquire the number of SS blocks in the SS block set of the neighbor cell. Thereby, the number of the measurements to the SS block set of the neighbor cell by the terminal may be reduced, the process of measuring the neighbor cell by the terminal may be simplified, and the time and the power consumed by the terminal in case of measuring the neighbor cell may be reduced.

In the above embodiments, explanation is only provided to a case in which the synchronization-related information includes one type of information. Of course, in some other embodiments of the present disclosure, the synchronization-related information may include multiple types of the above plurality of types of information, for example, include information indicating whether the pattern of the synchronization signal of the neighbor cell is the same as the pattern of the synchronization signal of the serving cell or not, and information indicating whether the period of the synchronization signal of the neighbor cell is the same as the period of the synchronization signal of the serving cell, and so on.

The synchronization-related information of the neighbor cell may also be other types of information related to the synchronization signal of the neighbor cell, in addition to the information described in the above, and is not listed in detail herein.

In the above embodiments of the present disclosure, the network side device may transmit the synchronization-related information of the neighbor cell to the terminal through broadcast.

That is, transmitting, by the network side device, the synchronization-related information of the neighbor cell to the terminal may include: transmitting, by the network side device, a broadcast message to the terminal, wherein the broadcast message carries the synchronization-related information of the neighbor cell.

Of course, in some other embodiments of the present disclosure, possibility of transmitting the synchronization-related information of the neighbor cell by using a dedicated signaling is also not excluded.

That is, transmitting, by the network side device, the synchronization-related information of the neighbor cell to the terminal may include: transmitting, by the network side device, a dedicated signaling to the terminal, wherein the dedicated signaling carries the synchronization-related information of the neighbor cell.

For example, the dedicated signaling may be a connection release signaling when a terminal in a connected state releases a connection.

In the above embodiments of the present disclosure, the synchronization-related information of neighbor cells of the terminal transmitted by the network side device to the terminal may include synchronization-related information of each of the neighbor cells.

Since the synchronization-related information includes the synchronization-related information of each of the neighbor cells, the information is indicated more detailedly, so as to facilitate a user to know the synchronization-related information of each neighbor cell more accurately.

For example, the transmitted synchronization-related information may include information about in-sync of a SS block set of a neighbor cell 1 with a SS block set of the serving cell, or information about out-of-sync of a SS block set of a neighbor cell 1 with a SS block set of the serving cell.

In the above embodiments of the present disclosure, the synchronization-related information of the neighbor cells transmitted by the network side device to the terminal may further include at least one piece of summary information, wherein the at least one piece of summary information includes a summary of synchronization-related information of the plurality of neighbor cells.

Since the synchronization-related information of the plurality of neighbor cells may be summarized in the summary information, link resources may be effectively saved.

For example, synchronization-related information of neighbor cells having the same frequency may be summarized, for example, the summarized synchronization-related information may include: information about in-sync of SS block sets of all neighbor cells with the SS block set of the serving cell at a first frequency, or information about in-sync of SS block sets of not all of the neighbor cells with the SS block set with the serving cell at the first frequency, or information about a maximum index of all indices of the neighbor cells being 6 and a minimum index of all indices of the neighbor cells being 3.

Of course, only one piece of summary information may be included in the synchronization-related information, and the piece of summary information includes a summary of synchronization-related information of all neighbor cells.

Since the synchronization-related information of all neighbor cells may be summarized in the above summary information, link resources may be further saved.

In some embodiments of the present disclosure, optionally, the summary information in the synchronization-related information may be indicated by 1 bit, or may be indicated by 2 bit, as described below by way of example.

In some embodiments of the present disclosure, each piece of summary information is indicated by 1 bit which may be an indication bit of 0 or 1.

For example, in a case that the indication bit of the summary information corresponding to the synchronization-related information of all neighbor cells at the first frequency is 1, it may be indicated that patterns of SS block sets of all neighbor cells at the first frequency are the same as that of the SS block set of the serving cell; in a case that the indication bit of the summary information corresponding to the synchronization-related information of all neighbor cells at the first frequency is 0, it may be indicated that not all patterns of the SS block sets of all neighbor cells at the first frequency is the same as the pattern of the SS block set of the serving cell.

In another embodiment, in a case that the indication bit of the summary information corresponding to the synchronization-related information of all neighbor cells at the first frequency is 1, it may be indicated that SS block sets of all neighbor cells at the first frequency are in sync with the SS block set of the serving cell; in a case that the indication bit of the summary information corresponding to the synchronization-related information of all neighbor cells at the first frequency is 0, it may be indicated that not all of the SS block sets of all neighbor cells at the first frequency are in sync with the SS block set of the serving cell.

In other embodiments of the present disclosure, each piece of summary information is indicated by 2 bits which may be indication bits of 11, 00, 10, or 01.

For example, in a case that the indication bits of the summary information corresponding to the synchronization-related information of all neighbor cells at the first frequency are 11, it may be indicated that patterns of SS block sets of all neighbor cells at the first frequency are the same as that of the SS block set of the serving cell; in a case that the indication bits of the summary information corresponding to the synchronization-related information of all neighbor cells at the first frequency are 00, it may be indicated that not all of patterns and periods of the SS block sets of all neighbor cells at the first frequency are the same as the pattern and the period of the SS block set of the serving cell; in a case that the indication bits of the summary information corresponding to the synchronization-related information of all neighbor cells at the first frequency are 10, it may be indicated that not all of the patterns of the SS block sets of all neighbor cells at the first frequency are the same as the pattern of the SS block set of the serving cell, but all of the periods of the SS block sets of all neighbor cells at the first frequency are the same as the period of the SS block set of the serving cell; in a case that the indication bits of the summary information corresponding to the synchronization-related information of all neighbor cells at the first frequency are 01, it may be indicated that not all of the patterns of the SS block sets of all neighbor cells at the first frequency are the same as the pattern of the SS block set of the serving cell, and not all of the periods of the SS block sets of all neighbor cells at the first frequency are the same as the period of the SS block set of the serving cell, but the number of SS blocks in the SS block set in each of the neighbor cells is not smaller than the number of SS blocks in the SS block set in the serving cell.

In the above embodiments, the network side device also needs to acquire the synchronization signal of the neighbor cell before the network side device determines the synchronization-related information of the neighbor cell.

In some optional embodiments, the network side device may interact with a network side device corresponding to the neighbor cell, so as to acquire the synchronization signal of the neighbor cell; then, the synchronization-related information of the neighbor cell may be determined according to the synchronization signal of the neighbor cell.

Of course, in this case, the network side device in the serving cell needs to have an interconnection interface with the network side device in the neighbor cell, and the synchronization signal of the neighbor cell may be obtained through the interconnection interface. Optionally, when the interconnection interface between the network side device in the serving cell and the network side device in the neighbor cell is established, the neighbor cell may inform the serving cell of a synchronization signal of the neighbor cell, and in a case that there is a subsequent update of the synchronization signal, the neighbor cell may also inform the serving cell of the update of the synchronization signal through an update message.

In other embodiments of the present disclosure, the network side device may also acquire a synchronization signal of a neighbor cell through an OAM (Operation, Management and Maintenance) configuration, and then, according to the synchronization signal of the neighbor cell, determines the synchronization-related information of the neighbor cell.

Figure 5:
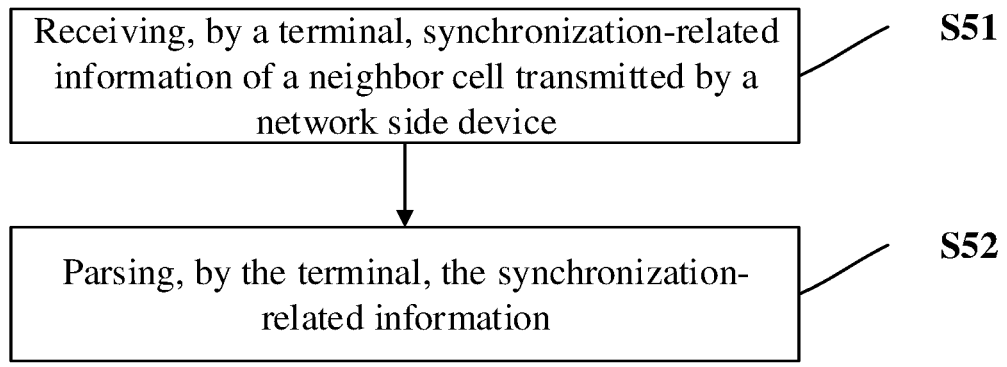
FIG. 5 is a flowchart of a processing method of neighbor cell information provided by the present disclosure.

FIG. 5 is a flow chart of a method of processing neighbor cell information provided by the present disclosure. An execution entity of the method of processing the neighbor cell information may be a terminal. The method of processing the neighbor cell information includes steps S51-S52.

Step S51: receiving, by the terminal, synchronization-related information of a neighbor cell transmitted by a network side device.

Step S52: parsing, by the terminal, the synchronization-related information.

Through the method of processing the neighbor cell information provided by some embodiments of the present disclosure, the terminal receives and parses the synchronization-related information of the neighbor cell transmitted by the network side device, so that the terminal may measure the neighbor cell based on the parsed synchronization-related information. Thereby, the number of the synchronization signal measurements to the neighbor cell by the terminal may be reduced, the process of measuring the neighbor cell by the terminal may be simplified, and the time and the power consumed by the terminal in case of measuring the neighbor cell may be reduced.

Optionally, after the step S52 of parsing, by the terminal, the synchronization-related information, the method further includes measuring the neighbor cell by the terminal based on the parsed synchronization-related information.

In some embodiments of the present disclosure, optionally, the synchronization-related information of the neighbor cell includes any one or more of the following: information indicating that a synchronization signal of a neighbor cell is in sync with a synchronization signal of a serving cell of the terminal; information indicating that the synchronization signal of the neighbor cell is out of sync with the synchronization signal of the serving cell; information indicating that synchronization signals of at least a part of neighbor cells are in sync with the synchronization signal of the serving cell; information indicating that the synchronization signals of at least a part of the neighbor cells are out of sync with the synchronization signal of the serving cell; information indicating that not all of the synchronization signals of at least a part of the neighbor cells are in sync with the synchronization signal of the serving cell; offset information of the synchronization signal of the neighbor cell relative to the synchronization signal of the serving cell; information indicating that a period of the synchronization signal of the neighbor cell is the same as that of the synchronization signal of the serving cell; information indicating that the period of the synchronization signal of the neighbor cell is different from that of the synchronization signal of the serving cell; information indicating that periods of synchronization signals of at least a part of neighbor cells are the same as that of the synchronization signal of the serving cell; information indicating that the periods of the synchronization signals of at least a part of the neighbor cells are different from that of the synchronization signal of the serving cell; information indicating that not all of the periods of the synchronization signals of at least a part of the neighbor cells are the same as that of the synchronization signal of the serving cell; information indicating that a pattern of the synchronization signal of the neighbor cell is the same as that of the synchronization signal of the serving cell; information indicating that the pattern of the synchronization signal of the neighbor cell is different from that of the synchronization signal of the serving cell; information indicating that patterns of synchronization signals of at least a part of neighbor cells are the same as that of the synchronization signal of the serving cell; information indicating that the patterns of the synchronization signals of at least a part of the neighbor cells are different from that of the synchronization signal of the serving cell; information indicating that not all of the patterns of the synchronization signals of at least a part of the neighbor cells are the same as that of the synchronization signal of the serving cell; information about the number of synchronization signal blocks in the synchronization signal of the neighbor cell; minimum index information of the synchronization signal block in the synchronization signal of the neighbor cell; and maximum index information of the synchronization signal block in the synchronization signal of the neighbor cell.

In a case that the method of transmitting neighbor cell information in some embodiments of the present disclosure is applied to the 5G system, the synchronization signal may be a SS block set, and the synchronization signal block may be a SS block.

In some embodiments of the present disclosure, the synchronization-related information may include synchronization-related information of each neighbor cell; or, the synchronization-related information includes at least one piece of summary information, and the summary information includes a summary of synchronization-related information of a plurality of neighbor cells.

In some embodiments of the present disclosure, the step of receiving, by the terminal, synchronization-related information of the neighbor cell transmitted by the network side device includes: receiving, by the terminal, a broadcast message or a dedicated signaling transmitted by the network side device, wherein the broadcast message or the dedicated signaling carries synchronization-related information of the neighbor cell.

For example, the dedicated signaling may be a connection release signaling in a case that the terminal in a connected state releases a connection.

Figure 6:
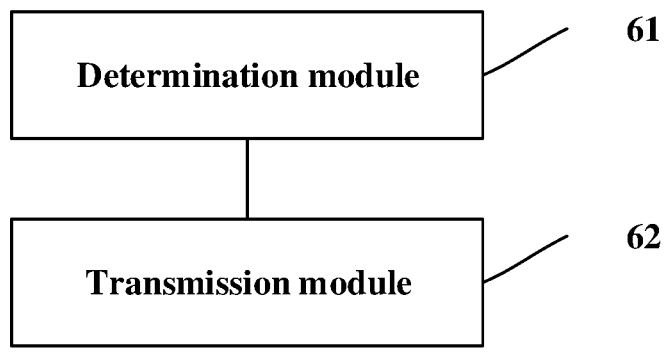
FIG. 6 is a schematic structural diagram of a network side device provided by the present disclosure.

Some embodiments of the present disclosure also provide a network side device based on the same inventive concept. Please refer to FIG. 6, FIG. 6 is a schematic structural diagram of a network side device provided in the present disclosure. The network side device includes a determination module 61 and a transmission module 62. The determination module is configured to determine synchronization-related information of a neighbor cell. The transmission module 62 is configured to transmit synchronization-related information of the neighbor cell to the terminal.

The network side device provided by some embodiments of the present disclosure may transmit the synchronization-related information of the neighbor cell to the terminal, so that the terminal may measure the neighbor cell according to the synchronization-related information. Thus, the number of the synchronization signal measurements to the neighbor cell may be reduced, the process of measuring the neighbor cell by the terminal may be simplified, and the time and the power consumed in a case that the terminal measures the neighbor cell may be reduced.

Optionally, the synchronization-related information of the neighbor cell includes any one or more of the following: information indicating that a synchronization signal of a neighbor cell is in sync with a synchronization signal of a serving cell of the terminal; information indicating that the synchronization signal of the neighbor cell is out of sync with the synchronization signal of the serving cell; information indicating that synchronization signals of at least a part of neighbor cells are in sync with the synchronization signal of the serving cell; information indicating that the synchronization signals of at least a part of the neighbor cells are out of sync with the synchronization signal of the serving cell; information indicating that not all of the synchronization signals of at least a part of the neighbor cells are in sync with the synchronization signal of the serving cell; offset information of the synchronization signal of the neighbor cell relative to the synchronization signal of the serving cell; information indicating that a period of the synchronization signal of the neighbor cell is the same as that of the synchronization signal of the serving cell; information indicating that the period of the synchronization signal of the neighbor cell is different from that of the synchronization signal of the serving cell; information indicating that periods of synchronization signals of at least a part of neighbor cells are the same as that of the synchronization signal of the serving cell; information indicating that the periods of the synchronization signals of at least a part of the neighbor cells are different from that of the synchronization signal of the serving cell; information indicating that not all of the periods of the synchronization signals of at least a part of the neighbor cells are the same as that of the synchronization signal of the serving cell; information indicating that a pattern of the synchronization signal of the neighbor cell is the same as that of the synchronization signal of the serving cell; information indicating that the pattern of the synchronization signal of the neighbor cell is different from that of the synchronization signal of the serving cell; information indicating that patterns of synchronization signals of at least a part of neighbor cells are the same as that of the synchronization signal of the serving cell; information indicating that the patterns of the synchronization signals of at least a part of the neighbor cells are different from that of the synchronization signal of the serving cell; information indicating that not all of the patterns of the synchronization signals of at least a part of the neighbor cells are the same as that of the synchronization signal of the serving cell; information about the number of synchronization signal blocks in the synchronization signal of the neighbor cell; minimum index information of the synchronization signal blocks in the synchronization signal of the neighbor cell; and maximum index information of the synchronization signal blocks in the synchronization signal of the neighbor cell.

In a case that the method of transmitting neighbor cell information in some embodiments of the present disclosure is applied to the 5G system, the synchronization signal may be an SS block set, and the synchronization signal block may be an SS block.

In some embodiments of the present disclosure, the synchronization-related information transmitted by the transmission module includes synchronization-related information of each neighbor cell.

In still other embodiments of the present disclosure, the synchronization-related information transmitted by the transmission module includes at least one piece of summary information, and the summary information includes a summary of synchronization-related information of a plurality of neighbor cells.

In order to acquire the synchronization signal of the neighbor cell, the network side device may further include an interaction module, configured to interact with a network side device corresponding to the neighbor cell so as to acquire the synchronization signal of the neighbor cell; wherein the determination module is specifically configured to determine the synchronization-related information of the neighbor cell based on the synchronization signal of the neighbor cell.

In some embodiment of that disclosure, the transmission module is specifically configured to transmit a broadcast message or a dedicated signaling to the terminal, wherein the broadcast message or the dedicated signaling carries the synchronization-related information of the neighbor cell.

The network side device in this embodiment may perform the method of transmitting the neighbor cell information in any of the foregoing embodiments, and an implementation principle and a technical effect in the embodiment are similar to those of the foregoing embodiments, and will not be described again herein.

Figure 7:
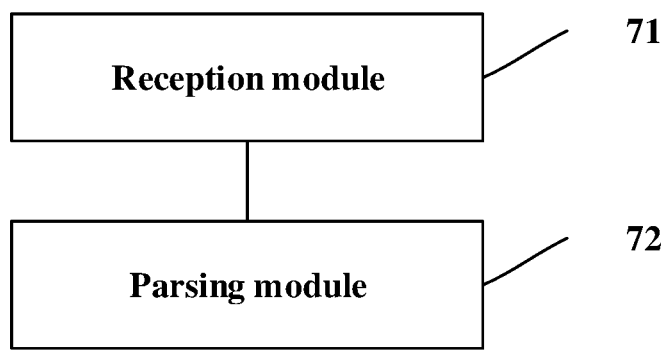
FIG. 7 is a schematic structural diagram of a terminal provided by the present disclosure.

Based on the same inventive concept, some embodiments of the present disclosure also provide a terminal. Please refer to FIG. 7, FIG. 7 is a schematic structural diagram of a terminal provided in the present disclosure. The terminal includes a reception module 71 and a parsing module 72. The reception module 71 is configured to receive synchronization-related information of a neighbor cell transmitted by a network side device. The parsing module 72 is configured to parse the synchronization-related information.

Optionally, the terminal may further include a measurement module configured to measure the neighbor cell based on the parsed synchronization-related information after the parsing module parses the synchronization-related information.

The terminal provided by some embodiments of the present disclosure may receive and parse the synchronization-related information of the neighbor cell transmitted by the network side device, so that the terminal may measure the neighbor cell based on the parsed synchronization-related information. Thereby, the number of the synchronization signal measurements to the neighbor cell by the terminal may be reduced, the process of measuring the neighbor cell by the terminal may be simplified, and the time and the power consumed by the terminal in case of measuring the neighbor cell may be reduced.

Optionally, the synchronization-related information of the neighbor cell includes any one or more of the following: information indicating that a synchronization signal of a neighbor cell is in sync with a synchronization signal of a serving cell of the terminal; information indicating that the synchronization signal of the neighbor cell is out of sync with the synchronization signal of the serving cell; information indicating that synchronization signals of at least a part of neighbor cells are in sync with the synchronization signal of the serving cell; information indicating that the synchronization signals of at least a part of the neighbor cells are out of sync with the synchronization signal of the serving cell; information indicating that not all of the synchronization signals of at least a part of the neighbor cells are in sync with the synchronization signal of the serving cell; offset information of the synchronization signal of the neighbor cell relative to the synchronization signal of the serving cell; information indicating that a period of the synchronization signal of the neighbor cell is the same as that of the synchronization signal of the serving cell; information indicating that the period of the synchronization signal of the neighbor cell is different from that of the synchronization signal of the serving cell; information indicating that periods of synchronization signals of at least a part of neighbor cells are the same as that of the synchronization signal of the serving cell; information indicating that the periods of the synchronization signals of at least a part of the neighbor cells are different from that of the synchronization signal of the serving cell; information indicating that not all of the periods of the synchronization signals of at least a part of the neighbor cells are the same as that of the synchronization signal of the serving cell; information indicating that a pattern of the synchronization signal of the neighbor cell is the same as that of the synchronization signal of the serving cell; information indicating that the pattern of the synchronization signal of the neighbor cell is different from that of the synchronization signal of the serving cell; information indicating that patterns of synchronization signals of at least a part of neighbor cells are the same as that of the synchronization signal of the serving cell; information indicating that the patterns of the synchronization signals of at least a part of the neighbor cells are different from that of the synchronization signal of the serving cell; information indicating that not all of the patterns of the synchronization signals of at least a part of the neighbor cells are the same as that of the synchronization signal of the serving cell; information about the number of synchronization signal blocks in the synchronization signal of the neighbor cell; minimum index information of the synchronization signal block in the synchronization signal of the neighbor cell; and maximum index information of the synchronization signal block in the synchronization signal of the neighbor cell.

In a case that the method of transmitting neighbor cell information in some embodiments of the present disclosure is applied to the 5G system, the synchronization signal may be a SS block set, and the synchronization signal block may be a SS block.

In some embodiments of the present disclosure, the synchronization-related information received by the reception module may include synchronization-related information of each neighbor cell; or, the synchronization-related information received by the reception module includes at least one piece of summary information, and the summary information includes a summary of synchronization-related information of a plurality of neighbor cells.

In some embodiments of the present disclosure, the reception module is specifically configured to receive a broadcast message or a dedicated signaling transmitted by the network side device, wherein the broadcast message or the dedicated signaling carries synchronization-related information of the neighbor cell.

The terminal in this embodiment is used to perform the method of processing the neighbor cell information in any of the foregoing embodiments, and an implementation principle and a technical effect in this embodiment are similar to those in the foregoing embodiments, and will not be described again here.

It should be noted that a division of modules in the network side device and the terminal above is only a division in respect of a logical function, and may be completely or partially integrated into one physical entity or may be physically separated in an actual implementation. These modules may all be implemented by a processing element through invoking software, or may all be implemented in a form of hardware. Optionally, a part of the modules may be implemented by the processing element through invoking software, and a part of the modules may be implemented in the form of hardware. For example, the determination module may be a separate processing element or may be integrated in one chip of an apparatus, or may be stored in a storage of the apparatus in a form of a program code for invoking and executing by one of processing elements in the above apparatus to implement functions of the determination module. An implementation of other modules is similar to that of the determination module. In addition, all or a part of these modules may be integrated together or may be implemented independently. The processing element described herein may be an integrated circuit having a signal processing capability. During implementation, steps of the method described above or the above modules may be accomplished by integrated logic circuitry in hardware of a processing element or by instructions in a form of software.

For example, the above modules may be one or more integrated circuits configured to implement the above methods, such as one or more Application Specific Integrated Circuit (ASIC), or, one or more Digital Signal Processor (DSP, for short), or, one or more Field Programmable Gate Arrays (FPGA, for short) or the like. As another example, in a case that one of the above modules is implemented by the processing element through invoking a program code, the processing element may be a general purpose processor, such as a Central Processing Unit (CPU, for short) or another processor that may call the ram code. As another example, these modules may be integrated together and implemented in a form of a system-on-a-chip (SOC, for short).

Figure 8:
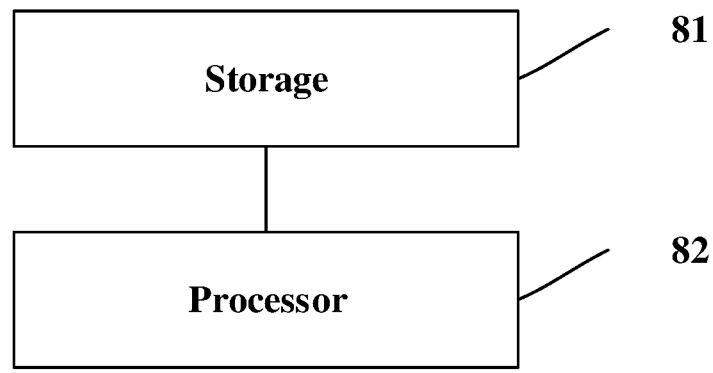
FIG. 8 is a schematic structural diagram of a network side device provided by the present disclosure.

FIG. 8 is a schematic structural diagram of a network side device provided by the present disclosure. As shown in FIG. 8, the network side device includes a storage 81, a processor 82, and a computer program stored on the storage 81 and executable by the processor 82; in a case that the processor 81 executes the program, the method of transmitting the neighbor cell information in any of the above embodiments is implemented by the processor 82.

The processor 82 herein may be a single processor, or may represent a plurality of processing elements, for example, the processor may be a CPU, or may be an ASIC, or one or more integrated circuits configured to implement the methods performed by the above network side device, such as one or more Digital Signal Processors (DSPs), or one or more Field Programmable Gate Arrays (FPGAs, for short), or the like.

The storage 81 may be a single storage or may represent as a plurality of storage elements. The storage 81 may be a volatile memory or a non-volatile memory, or may include both volatile and non-volatile memories. The non-volatile memory may be a Read Only Memory (ROM, for short), a Programmable ROM (PROM, for short), an Erasable PROM (EPROM, for short), an Electrically EPROM (EEPROM, for short), or a flash memory. The volatile memory may be a Random Access Memory (RAM, for short) which is used as an external cache. By way of example, but not limitation, many forms of RAM may be used, such as a Static RAM (SRAM, for short), a Dynamic RAM (DRAM, for short), a Synchronous DRAM (SDRAM, for short), a Double Data Rate SDRAM (DDRSDRAM, for short), an Enhanced SDRAM (ESDRAM, for short), a SynchLink DRAM (SLDRAM, for short), and a DirectRambus RAM (DRRAM, for short). The storage 81 described by some embodiments of the present disclosure is intended to include, but is not limited to, these and any other suitable types of storages.

Figure 9:
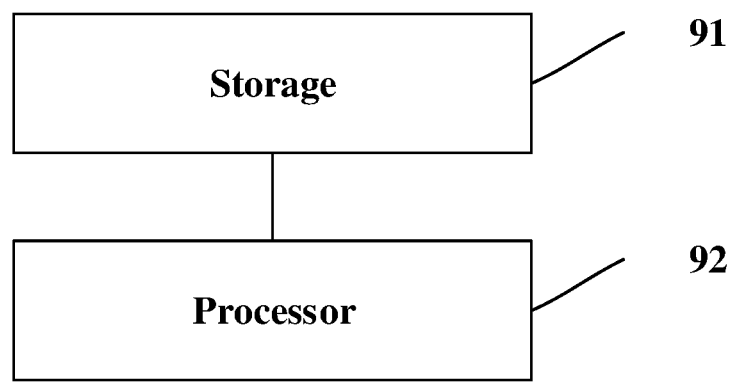
FIG. 9 is a schematic structural diagram of a terminal provided by the present disclosure.

FIG. 9 is a schematic structural diagram of a terminal provided by the present disclosure. As shown in FIG. 9, the terminal includes a storage 91, a processor 92, and a computer program stored on the storage 91 and executable on the processor 92; in a case that the processor 91 executes the program, the method of processing the neighbor cell information in any of the above embodiments is implemented by the processor 92.

The processor 92 herein may be a single processor, or may represent a plurality of processing elements, for example, the processor may be a CPU, or may be an ASIC, or one or more integrated circuits configured to implement the methods performed by the above network side device, such as one or more Digital Signal Processors (DSPs), or one or more Field Programmable Gate Arrays (FPGAs, for short), or the like.

The storage 91 may be a single storage or may represent as a plurality of storage elements. The storage 91 may be a volatile memory or a non-volatile memory, or may include both volatile and non-volatile memories. The non-volatile memory may be a Read Only Memory (ROM, for short), a Programmable ROM (PROM, for short), an Erasable PROM (EPROM, for short), an Electrically EPROM (EEPROM, for short), or a flash memory. The volatile memory may be a Random Access Memory (RAM, for short) which is used as an external cache. By way of example, but not limitation, many forms of RAM may be used, such as a Static RAM (SRAM, for short), a Dynamic RAM (DRAM, for short), a Synchronous DRAM (SDRAM, for short), a Double Data Rate SDRAM (DDRSDRAM, for short), an Enhanced SDRAM (ESDRAM, for short), a SynchLink DRAM (SLDRAM, for short), and a DirectRambus RAM (DRRAM, for short). The storage 91 described by some embodiments of the present disclosure is intended to include, but is not limited to, these and any other suitable types of storages.

Some embodiments of the present disclosure also provide a computer readable storage medium having stored thereon a computer program, wherein in a case that the computer program is executed by a processor, the processor implements steps in the method of transmitting neighbor cell information in any of the embodiments described above.

Some embodiments of the present disclosure also provide a computer readable storage medium having stored thereon a computer program, wherein in a case that the computer program is executed by a processor, the processor implements steps in the method of processing neighbor cell information in any of the embodiments described above.

The computer readable media including a volatile or a non-volatile, removable and non-removable media, may implement information storage by any method or technique. The information may be computer readable instructions, data structures, modules of programs, or other data. Examples of a computer storage medium include, but are not limited to, a Phase Change Memory (PRAM), a Static Random Access Memory (SRAM), a Dynamic Random Access Memory (DRAM), other types of Random Access Memories (RAMs), a Read Only Memory (ROM), an Electrically Erasable Programmable Read Only Memory (EEPROM), a flash memory, or other memory technology, a Compact-Disc Read-Only Memory (CD-ROM), a Digital Versatile Disc (DVD) or other optical storages, a magnetic-tape cassette, a Magnetic-disk storage or another magnetic storage device or any other non-transmission medium. All of the above may be used to store information that may be accessed by a computing device.

The foregoing are optional embodiments of the present disclosure. It should be noted that several modifications and refinements may be made by those of ordinary skills in the art without departing from the principles of the present disclosure. These modifications and refinements should also be considered to be within the scope of the present disclosure.

What is claimed is:
1. A method of transmitting neighbor cell information comprising:
   determining, by a network side device, synchronization-related information of a neighbor cell; and
   transmitting, by the network side device, the synchronization-related information of the neighbor cell to a terminal;
   wherein the synchronization-related information of the neighbor cell comprises
   information indicating that a period of a synchronization signal of the neighbor cell is same as a period of a synchronization signal of a serving cell; and
   information indicating that a pattern of the synchronization signal of the neighbor cell is same as a pattern of the synchronization signal of the serving cell;
   wherein the pattern of the synchronization signal of the neighbor cell being the same as the pattern of the synchronization signal of the serving cell is that a quantity of synchronization signal blocks in the synchronization signal of the neighbor cell is the same as a quantity of synchronization signal blocks in the synchronization signal of the serving cell.

2. The method according to claim 1, wherein the synchronization-related information of the neighbor cell comprises any one or more of:
   information indicating that a synchronization signal of a neighbor cell is in sync with a synchronization signal of a serving cell of the terminal;
   information indicating that a synchronization signal of a neighbor cell is out of sync with a synchronization signal of the serving cell;
   information indicating that synchronization signals of at least a part of neighbor cells are in sync with a synchronization signal of the serving cell;
   information indicating that synchronization signals of at least a part of neighbor cells are out of sync with a synchronization signal of the serving cell;
   information indicating that not all of synchronization signals of at least a part of neighbor cells are in sync with a synchronization signal of the serving cell;
   offset information of a synchronization signal of a neighbor cell relative to the synchronization signal of the serving cell;
   information indicating that a period of a synchronization signal of a neighbor cell is different from a period of a synchronization signal of the serving cell;
   information indicating that periods of synchronization signals of at least a part of neighbor cells are the same as a period of a synchronization signal of the serving cell;
   information indicating that periods of synchronization signals of at least a part of neighbor cells are different from a period of a synchronization signal of the serving cell;
   information indicating that not all of periods of synchronization signals of at least a part of neighbor cells are a same as a period of a synchronization signal of the serving cell;
   information indicating that a pattern of a synchronization signal of a neighbor cell is different from a pattern of a synchronization signal of the serving cell;
   information indicating that patterns of synchronization signals of at least a part of neighbor cells are a same as a pattern of a synchronization signal of the serving cell;
   information indicating that patterns of synchronization signals of at least a part of neighbor cells are different from a pattern of a synchronization signal of the serving cell;
   information indicating that not all of patterns of synchronization signals of at least a part of neighbor cells are a same as a pattern of a synchronization signal of the serving cell;
   information about the number of synchronization signal blocks in the synchronization signal of the neighbor cell;
   minimum index information of a synchronization signal block in a synchronization signal of the neighbor cell; and
   maximum index information of a synchronization signal block in a synchronization signal of the neighbor cell.

3. The method according to claim 1, wherein the synchronization-related information comprises synchronization-related information of each of a plurality of neighbor cells; or
   the synchronization-related information comprises at least one piece of summary information, the summary information comprising a summary of synchronization-related information of a plurality of neighbor cells.

4. The method according to claim 1, wherein before determining, by the network side device, the synchronization-related information of the neighbor cell, the method further comprises interacting, by the network side device, with a network side device corresponding to the neighbor cell, and acquiring a synchronization signal of the neighbor cell;
   determining, by the network side device, the synchronization-related information of the neighbor cell comprises: determining, by the network side device, the synchronization-related information of the neighbor cell based on the synchronization signal of the neighbor cell.

5. The method according to claim 1, wherein transmitting, by the network side device, the synchronization-related information of the neighbor cell to the terminal comprises:
   transmitting, by the network side device, a broadcast message or a dedicated signaling to the terminal, the broadcast message or the dedicated signaling carrying the synchronization-related information of the neighbor cell.

6. A method of processing neighbor cell information, comprising:
   receiving, by a terminal, synchronization-related information of a neighbor cell transmitted by a network side device; and
   parsing, by the terminal, the synchronization-related information;
   wherein the synchronization-related information of the neighbor cell comprises:
   information indicating that a period of a synchronization signal of the neighbor cell is same as a period of a synchronization signal of a serving cell; and
   information indicating that a pattern of the synchronization signal of the neighbor cell is same as a pattern of the synchronization signal of the serving cell;
   wherein the pattern of the synchronization signal of the neighbor cell being the same as the pattern of the synchronization signal of the serving cell is that a quantity of synchronization signal blocks in the synchronization signal of the neighbor cell is the same as a quantity of synchronization signal blocks in the synchronization signal of the serving cell.

7. The method according to claim 6, wherein after parsing, by the terminal, the synchronization-related information, the method further comprises:
   measuring the neighbor cell by the terminal based on the parsed synchronization-related information.

8. The method according to claim 6, wherein the synchronization-related information of the neighbor cell comprises any one or more of:
   information indicating that a synchronization signal of a neighbor cell is in sync with a synchronization signal of a serving cell of the terminal;
   information indicating that a synchronization signal of a neighbor cell is out of sync with a synchronization signal of the serving cell;
   information indicating that synchronization signals of at least a part of neighbor cells are in sync with a synchronization signal of the serving cell;
   information indicating that synchronization signals of at least a part of neighbor cells are out of sync with a synchronization signal of the serving cell;
   information indicating that not all of synchronization signals of at least a part of neighbor cells are in sync with a synchronization signal of the serving cell;

offset information of a synchronization signal of a neighbor cell relative to the synchronization signal of the serving cell;

information indicating that a period of a synchronization signal of a neighbor cell is different from a period of a synchronization signal of the serving cell;

information indicating that periods of synchronization signals of at least a part of neighbor cells are the same as a period of a synchronization signal of the serving cell;

information indicating that periods of synchronization signals of at least a part of neighbor cells are different from a period of a synchronization signal of the serving cell;

information indicating that not all of periods of synchronization signals of at least a part of neighbor cells are a same as a period of a synchronization signal of the serving cell;

information indicating that a pattern of a synchronization signal of a neighbor cell is different from a pattern of a synchronization signal of the serving cell;

information indicating that patterns of synchronization signals of at least a part of neighbor cells are a same as a pattern of a synchronization signal of the serving cell;

information indicating that patterns of synchronization signals of at least a part of neighbor cells are different from a pattern of a synchronization signal of the serving cell;

information indicating that not all of patterns of synchronization signals of at least a part of neighbor cells are a same as a pattern of a synchronization signal of the serving cell;

information about the number of synchronization signal blocks in the synchronization signal of the neighbor cell;

minimum index information of a synchronization signal block in a synchronization signal of the neighbor cell; and maximum index information of a synchronization signal block in a synchronization signal of the neighbor cell.

9. The method according to claim 6, wherein,
the synchronization-related information comprises synchronization-related information of each of a plurality of neighbor cells; or
the synchronization-related information comprises at least one piece of summary information, the summary information comprising a summary of synchronization-related information of a plurality of neighbor cells.

10. The method according to claim 6, wherein receiving, by the terminal, the synchronization-related information of the neighbor cell transmitted by the network side device comprises:
receiving, by the terminal, a broadcast message or a dedicated signaling transmitted by the network side device, the broadcast message or the dedicated signaling carrying the synchronization-related information of the neighbor cell.

11. A network side device, comprising:
a storage, a processor, and a computer program stored on the storage and executable by the processor;
wherein the processor implements the method of transmitting the neighbor cell information according to claim 1 when the processor executes the program.

12. A terminal, comprising:
a storage, a processor, and a computer program stored on the storage and executable by the processor;
wherein the processor implements the method of processing the neighbor cell information according to claim 6 when the processor executes the program.

13. The network side device according to claim 11, wherein, the synchronization-related information of the neighbor cell comprises any one or more of:
information indicating that a synchronization signal of a neighbor cell is in sync with a synchronization signal of a serving cell of the terminal;

information indicating that a synchronization signal of a neighbor cell is out of sync with a synchronization signal of the serving cell;

information indicating that synchronization signals of at least a part of neighbor cells are in sync with a synchronization signal of the serving cell;

information indicating that synchronization signals of at least a part of neighbor cells are out of sync with a synchronization signal of the serving cell;

information indicating that not all of synchronization signals of at least a part of neighbor cells are in sync with a synchronization signal of the serving cell;

offset information of a synchronization signal of a neighbor cell relative to the synchronization signal of the serving cell;

information indicating that a period of a synchronization signal of a neighbor cell is different from a period of a synchronization signal of the serving cell;

information indicating that periods of synchronization signals of at least a part of neighbor cells are the same as a period of a synchronization signal of the serving cell;

information indicating that periods of synchronization signals of at least a part of neighbor cells are different from a period of a synchronization signal of the serving cell;

information indicating that not all of periods of synchronization signals of at least a part of neighbor cells are a same as a period of a synchronization signal of the serving cell;

information indicating that a pattern of a synchronization signal of a neighbor cell is different from a pattern of a synchronization signal of the serving cell;

information indicating that patterns of synchronization signals of at least a part of neighbor cells are a same as a pattern of a synchronization signal of the serving cell;

information indicating that patterns of synchronization signals of at least a part of neighbor cells are different from a pattern of a synchronization signal of the serving cell;

information indicating that not all of patterns of synchronization signals of at least a part of neighbor cells are a same as a pattern of a synchronization signal of the serving cell;

information about the number of synchronization signal blocks in the synchronization signal of the neighbor cell;

minimum index information of a synchronization signal block in a synchronization signal of the neighbor cell; and maximum index information of a synchronization signal block in a synchronization signal of the neighbor cell.

14. The network side device according to claim 11, wherein, the synchronization-related information comprises synchronization-related information of each of a plurality of neighbor cells; or
the synchronization-related information comprises at least one piece of summary information, the summary information comprising a summary of synchronization-related information of a plurality of neighbor cells.

15. The network side device according to claim 11, wherein before determining, by the network side device, the synchronization-related information of the neighbor cell, when the processor executes the program, the processor further implements: interacting with a network side device corresponding to the neighbor cell, and acquiring a synchronization signal of the neighbor cell;
    determining, by the network side device, the synchronization-related information of the neighbor cell comprises: determining, by the network side device, the synchronization-related information of the neighbor cell based on the synchronization signal of the neighbor cell.

16. The network side device according to claim 11, wherein, transmitting, by the network side device, the synchronization-related information of the neighbor cell to the terminal comprises:
    transmitting, by the network side device, a broadcast message or a dedicated signaling to the terminal, the broadcast message or the dedicated signaling carrying the synchronization-related information of the neighbor cell.

17. The terminal according to claim 12, wherein, after parsing, by the terminal, the synchronization-related information, when the processor executes the program, the processor further implements:
    measuring the neighbor cell by the terminal based on the parsed synchronization-related information.

18. The terminal according to claim 12, wherein, the synchronization-related information of the neighbor cell comprises any one or more of:
    information indicating that a synchronization signal of a neighbor cell is in sync with a synchronization signal of a serving cell of the terminal;
    information indicating that a synchronization signal of a neighbor cell is out of sync with a synchronization signal of the serving cell;
    information indicating that synchronization signals of at least a part of neighbor cells are in sync with a synchronization signal of the serving cell;
    information indicating that synchronization signals of at least a part of neighbor cells are out of sync with a synchronization signal of the serving cell;
    information indicating that not all of synchronization signals of at least a part of neighbor cells are in sync with a synchronization signal of the serving cell;
    offset information of a synchronization signal of a neighbor cell relative to the synchronization signal of the serving cell;
    information indicating that a period of a synchronization signal of a neighbor cell is different from a period of a synchronization signal of the serving cell;
    information indicating that periods of synchronization signals of at least a part of neighbor cells are the same as a period of a synchronization signal of the serving cell;
    information indicating that periods of synchronization signals of at least a part of neighbor cells are different from a period of a synchronization signal of the serving cell;
    information indicating that not all of periods of synchronization signals of at least a part of neighbor cells are a same as a period of a synchronization signal of the serving cell;
    information indicating that a pattern of a synchronization signal of a neighbor cell is different from a pattern of a synchronization signal of the serving cell;
    information indicating that patterns of synchronization signals of at least a part of neighbor cells are a same as a pattern of a synchronization signal of the serving cell;
    information indicating that patterns of synchronization signals of at least a part of neighbor cells are different from a pattern of a synchronization signal of the serving cell;
    information indicating that not all of patterns of synchronization signals of at least a part of neighbor cells are a same as a pattern of a synchronization signal of the serving cell;
    information about the number of synchronization signal blocks in the synchronization signal of the neighbor cell;
    minimum index information of a synchronization signal block in a synchronization signal of the neighbor cell; and
    maximum index information of a synchronization signal block in a synchronization signal of the neighbor cell.

19. The terminal according to claim 12, wherein, the synchronization-related information comprises synchronization-related information of each of a plurality of neighbor cells; or
    the synchronization-related information comprises at least one piece of summary information, the summary information comprising a summary of synchronization-related information of a plurality of neighbor cells.

20. The terminal according to claim 12, wherein, receiving, by the terminal, the synchronization-related information of the neighbor cell transmitted by the network side device comprises:
    receiving, by the terminal, a broadcast message or a dedicated signaling transmitted by the network side device, the broadcast message or the dedicated signaling carrying the synchronization-related information of the neighbor cell.

\* \* \* \* \*